United States Patent [19]
Perrot et al.

[11] Patent Number: 5,408,151
[45] Date of Patent: Apr. 18, 1995

[54] ELECTROMAGNETIC MOTOR, IN PARTICULAR OF THE STEPPING TYPE, INCLUDING A CASE ENGAGED WITHIN A STATOR

[75] Inventors: Friedrich Perrot, Lengnau; Francois Diaz, Bienne, both of Switzerland

[73] Assignee: Eta SA Fabriques d'Ebauches, Grenchen, Switzerland

[21] Appl. No.: 182,552

[22] Filed: Jan. 14, 1994

[30] Foreign Application Priority Data

Jan. 18, 1993 [CH] Switzerland ............... 00 128/93

[51] Int. Cl.6 .............................................. H02K 7/10
[52] U.S. Cl. ................................ 310/40 MM; 310/43; 310/49 R
[58] Field of Search ............ 310/40 R, 40 MM, 49 R, 310/43, 83, 90, 156

[56] References Cited

U.S. PATENT DOCUMENTS

| | | | |
|---|---|---|---|
| 2,792,510 | 5/1957 | De Wolf | 310/43 X |
| 4,330,697 | 5/1982 | Danley et al. | 310/43 X |
| 4,412,144 | 10/1983 | Denisov et al. | 310/49 R |
| 4,483,627 | 11/1984 | Muller et al. | 310/40 MM X |
| 4,628,065 | 7/1987 | English et al. | 310/90 |
| 4,638,204 | 1/1987 | Krichner et al. | 310/43 X |
| 4,725,749 | 2/1988 | Wuthrich | 310/43 X |
| 4,841,190 | 6/1989 | Matsushita et al. | 310/43 X |
| 4,912,832 | 4/1990 | Egger et al. | 310/40 MM X |
| 5,126,607 | 6/1992 | Merriman, Jr. | 310/43 X |
| 5,206,554 | 4/1993 | Perrot | 310/40 MM |
| 5,287,028 | 2/1994 | Suzuki et al | 310/90 X |

Primary Examiner—Mark O. Budd
Attorney, Agent, or Firm—Weil, Gotshal & Manges

[57] ABSTRACT

The present invention concerns an electromagnetic motor of the type including a stator (4), a rotor (6) mounted for rotation relative to the stator, and a cage (2a, 2b, 2c, 2d, 2e) fixedly engaged relative to the stator, such cage including a bottom (18), a cover (22) and a body (20), the rotor being mounted for rotation in the interior of the cage, such motor being characterized in that the cage (2a, 2b, 2c, 2d, 2e) is formed from a synthetic material, while mechanical anchoring and positioning means are provided between the wall (P) of the cage body (20) and the stator (4) which leave the wall (P) free. This motor is intended for fitting out a timepiece in particular.

10 Claims, 5 Drawing Sheets

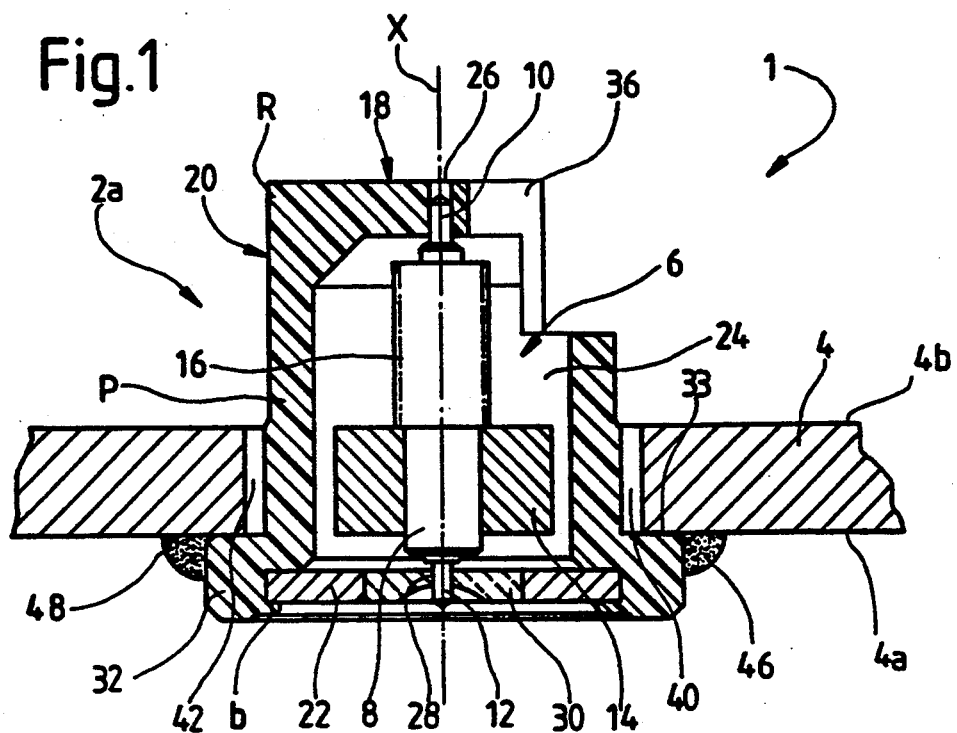
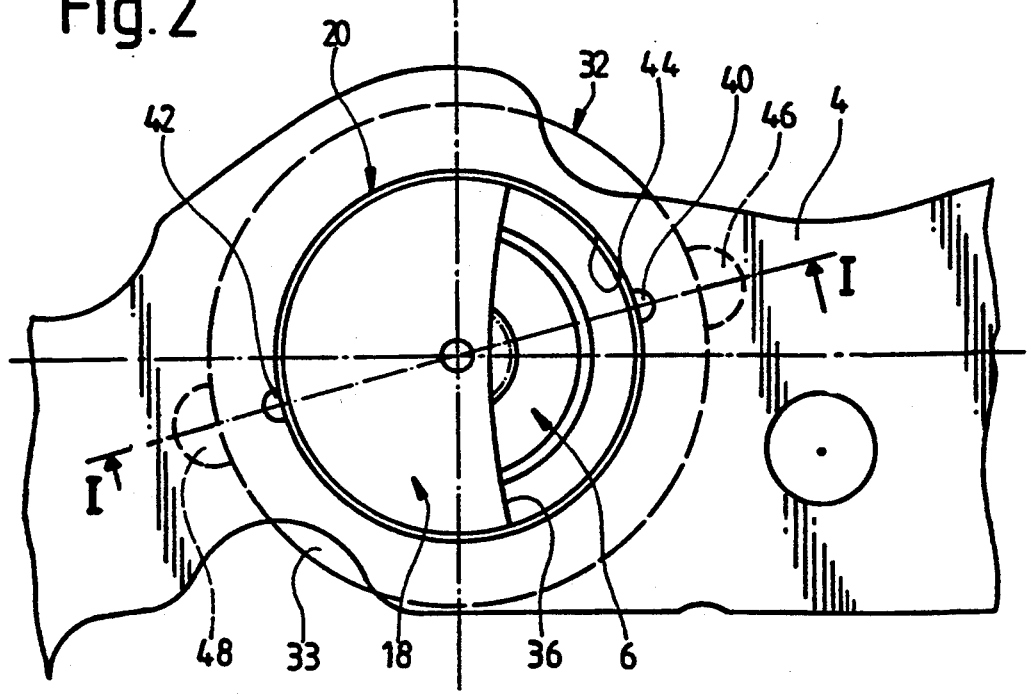

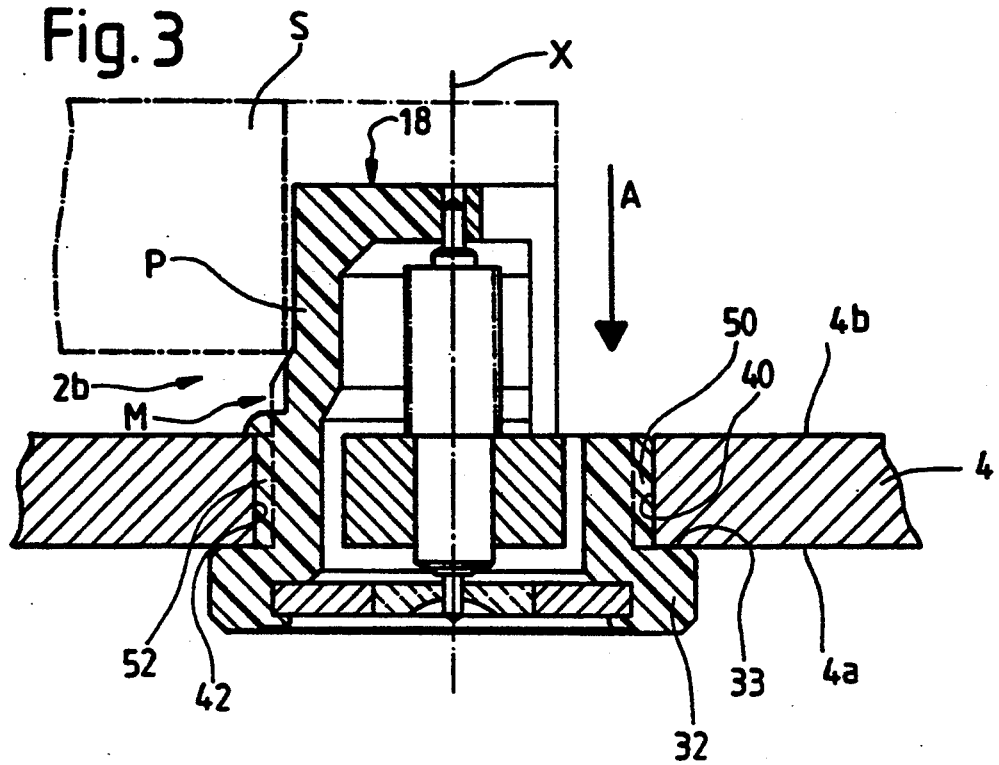
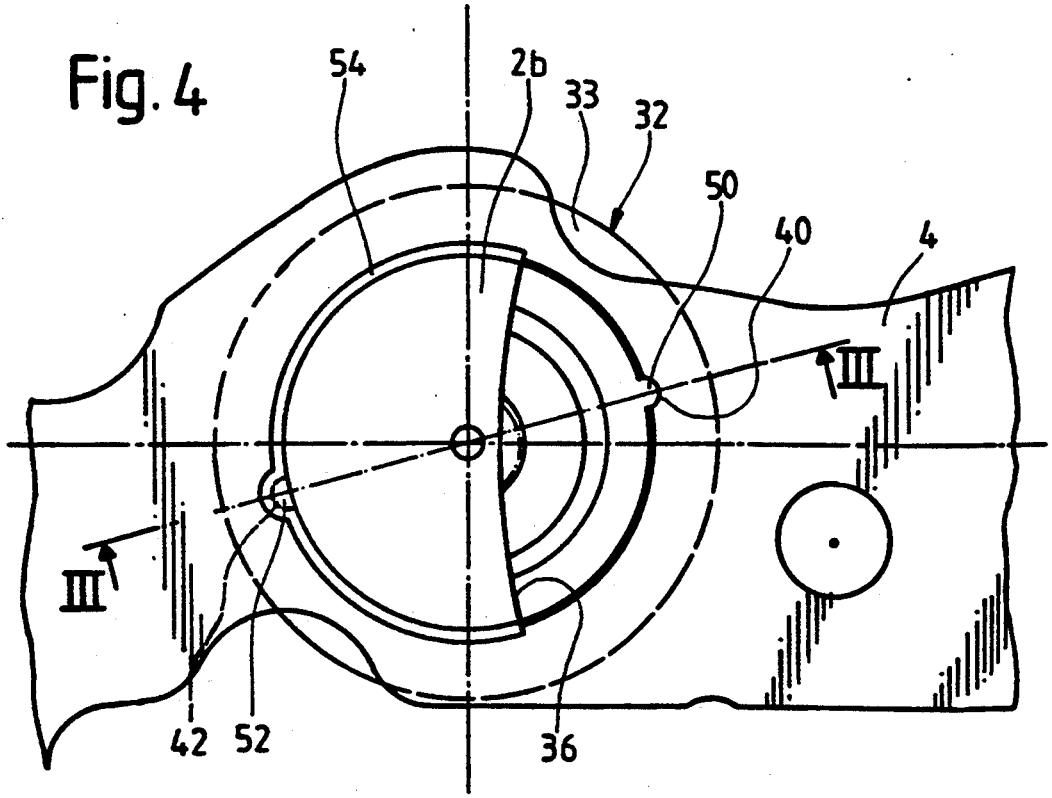

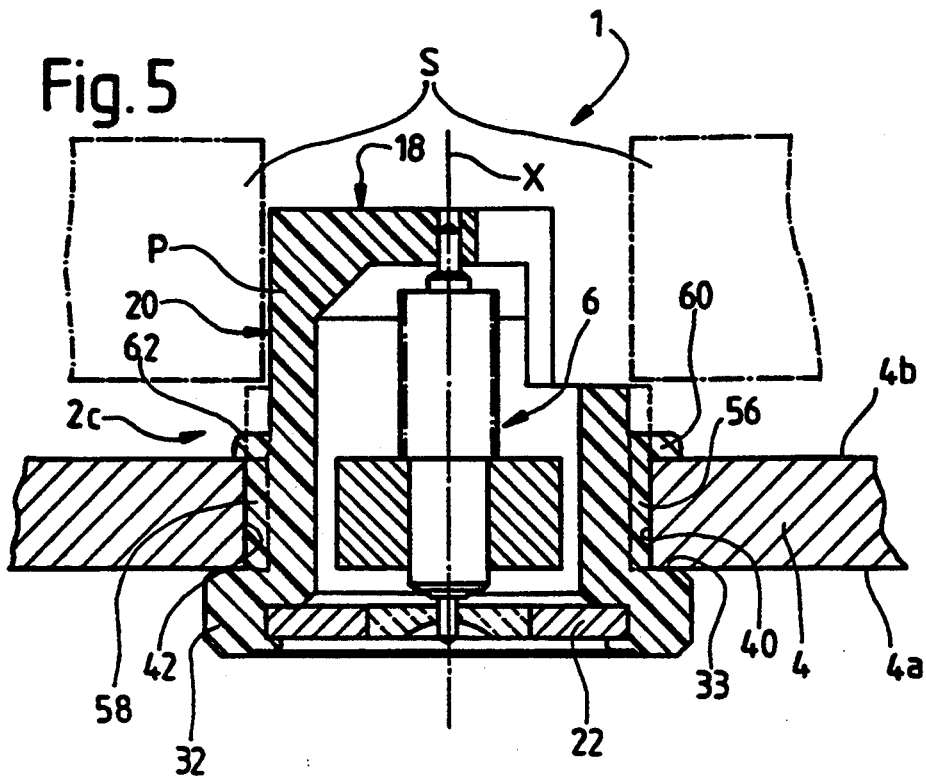
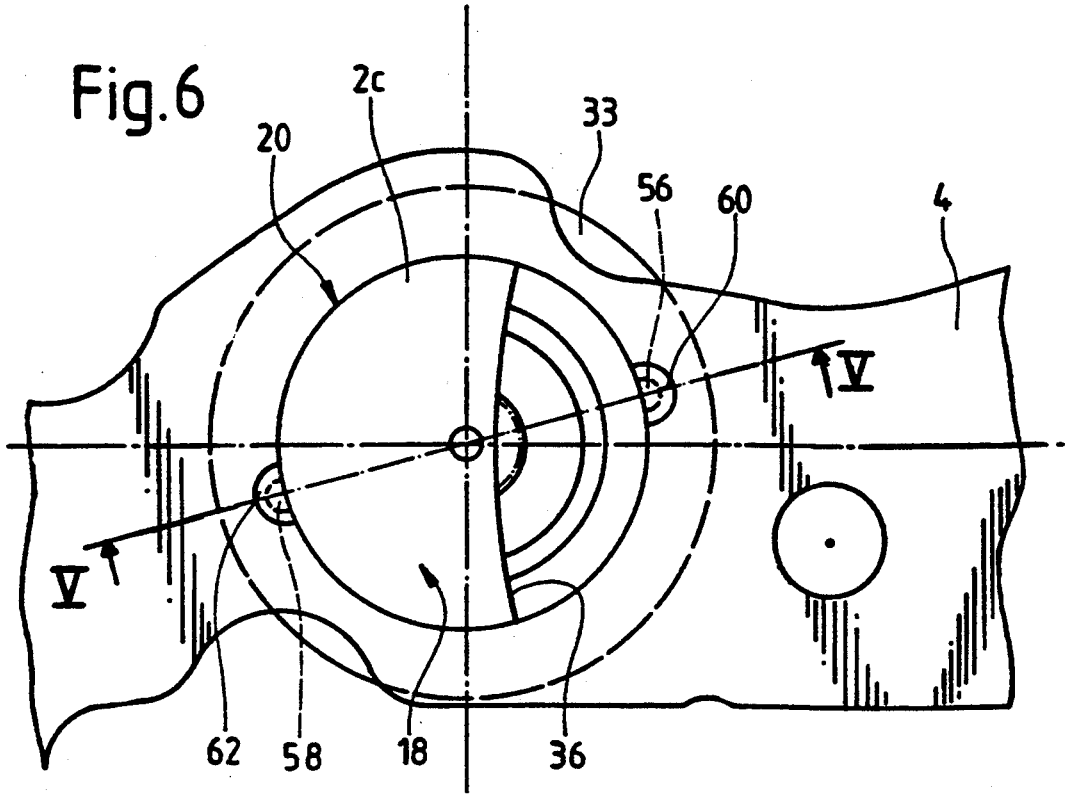

ELECTROMAGNETIC MOTOR, IN PARTICULAR OF THE STEPPING TYPE, INCLUDING A CASE ENGAGED WITHIN A STATOR

BACKGROUND OF THE INVENTION

In this type of design which is well known, the electromagnetic motor includes a rotor with which a permanent magnet is associated, such rotor being mounted for rotation by means of pivots within the cage.

To this end, such cage, which is formed in the known arrangements of a non-magnetic metallic material such as brass, includes a bottom and a cover in which are respectively formed a first and second guidance orifice while the rotor includes, at its ends, two pivots respectively engaged in said orifices.

Such cage, which exhibits a form generated by rotation, is provided with a cylindrical body the wall of which is integral with the bottom and supports the cover which is inserted and fixedly maintained therein.

In order to permit mechanical coupling between teeth which are formed on the rotor and an exterior mechanism to be driven, such cage includes, in the bottom mentioned above, a cut-out which extends axially in the wall of the cylindrical body and which leaves the place free in order to accommodate the exterior wheel of the mechanism to be driven.

This type of electromagnetic stepping motor is used in timepieces.

For construction reasons, it has been sought to form the cage which has just been described from a material other than metallic material.

Thus, it has been possible to define that use of synthetic materials was more favourable in this application, in particular in lowering the manufacturing cost.

Nevertheless, the forming of such a cage of synthetic material and its assembly on the motor causes numerous problems to become apparent.

Effectively, known metal cages offer a resistance to lateral stresses which is such that such cages can be driven (force mounted) within the interior of the stator which includes a circular orifice provided to this end.

This type of driving cannot be envisaged with cages formed of synthetic material because of their low resistance.

Thus, the present invention has as purpose to provide an electromagnetic motor including a cage of synthetic material which can be anchored in a stator of the motor in a reliable manner without subjecting the body of the cage to stresses likely to bring about its deformation.

SUMMARY OF THE INVENTION

To this end, the invention has as objective an electromagnetic motor of the type including a stator, a rotor mounted for rotation relative to the stator, and a cage fixedly engaged relative to the stator, such cage including a bottom, a cover and a body, said rotor being mounted for rotation in the interior of the cage, characterized in that the cage is formed from a synthetic material, while mechanical anchoring and positioning means which leave the wall of the cage body free are provided between the wall and said stator.

It will also be specified that the anchoring means are partially formed by a seat of said cage which rests axially against a face of the stator.

According to one embodiment of the invention, the anchoring means are constituted by at least one glue point arranged between said stator and the outer periphery of the seat of the cage.

According to another embodiment, the anchoring means are formed by a deformed region of the cage which confines the stator in cooperation with said seat.

But other characteristics and advantages of the invention will appear more clearly upon reading the detailed description which follows taken with reference to the attached drawings showing by way of example different embodiments of the motor of the invention.

BRIEF DESCRIPTION OF THE DRAWINGS

FIGS. 1, 3, 5, 7 and 9 are longitudinal cross-sectional views showing respectively a first, a second, a third, a fourth and a fifth embodiment of the motor according to the invention, and FIGS. 2, 4, 6, 8 and 10 are top views of the respective FIGS. 1, 3, 5, 7 and 9.

DESCRIPTION OF THE PREFERRED EMBODIMENTS

Figure 7:
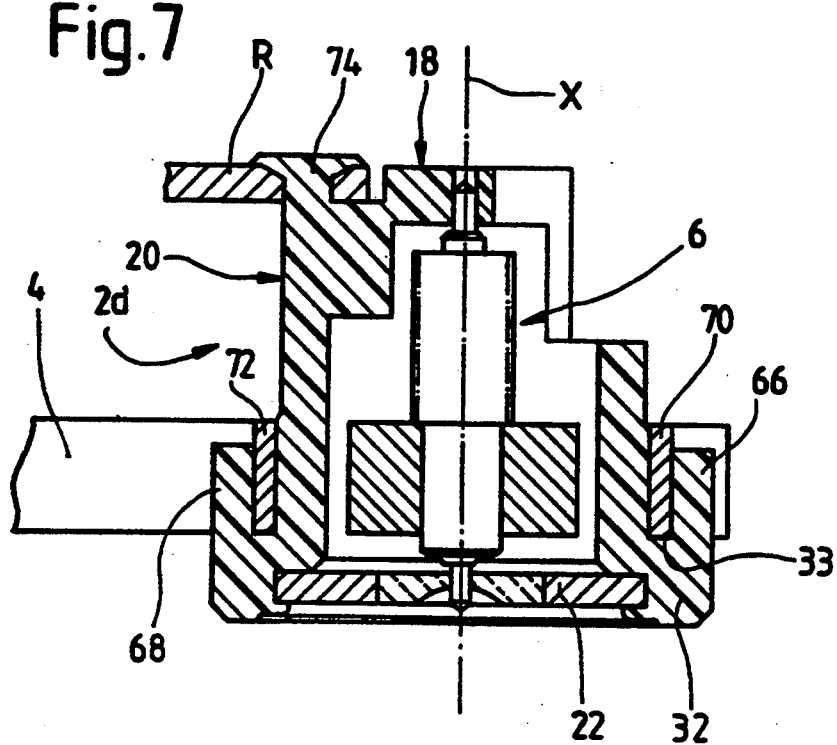

In referring henceforth to FIG. 1, there will be described hereinafter a first embodiment of an electromagnetic motor, in particular of the stepping type, in conformity with the invention.

This motor, which is identified by the general reference 1, includes a cage 2a which is fixedly mounted relative to a stator 4, here shown in a partial manner.

Within the interior of cage 2a is rotatably mounted a rotor 6 which includes a cylindrical body 8. Pivots, respectively an upper pivot 10 and a lower pivot 12, which extend along a rotation axis X around which rotor 6 can rotate, are provided at the ends of the body 8.

Motor 1 includes a permanent magnet 14, formed of a known material such as samarium-cobalt, and which is assembled on the body 8 of rotor 6 in the neighbourhood of the lower pivot 12. Furthermore, rotor 6 includes teeth 16, here shown in a schematic manner, such teeth being formed in the body 8 in the neighbourhood of the upper pivot 10 and intended to mesh with a wheel, not shown, of a mechanism to be driven.

Cage 2a, and in particular its wall P, is formed of a synthetic material, for example of POM (polyoxymethylene) by a known injection procedure. Such cage 2a includes a bottom 18, a body 20 and a cover 22.

More specifically, cage 2a includes, at the level of cover 22, a seat 32 formed by a flange integral with the body 20, such flange forming a seat extending radially outward from the body 20 on the side opposite to the bottom 18.

Body 20 exhibits a basically cylindrical form and it extends longitudinally along the axis of revolution X. Such body 20 is limited at its two ends, on the one hand by bottom 18 and on the other hand by seat 32.

Bottom 18, the cylindrical body 20 and the cover 22 bound a housing 24 in which is housed rotor 6. It will be noted that the bottom 18 is integral with the body 20 while cover 22 is inserted in the latter.

Bottom 18 and cover 22 include respectively a first and a second guidance orifice 26 and 28 arranged in a coaxial manner along the rotation axis X. In this embodiment, the guidance orifice 28 is formed on the interior of a stone 30 which is driven into cover 22 formed of a metallic material such as brass. The two guidance orifices 26 and 28 receive respectively pivots 10 and 12 formed on rotor 6.

As is seen on FIG. 1, cover 22 is fixedly maintained on the interior of seat 32 of cage 2a by means of a circular bead b formed by cold or hot deformation from seat 32, for example by an ultrasonic technique. Bead b overlies the periphery of cover 22 to confine it within seat 32.

Seat 32 forms an outer shoulder 33 on the cage which rests in axial bearing against a face 4a of stator 4, referred to as the lower face.

For the rest, cage 2a includes an opening 36 formed directly in bottom 18 and extending axially in body 20 in order to assure in particular the establishment of the engagement between teeth 16 formed on rotor 6 and the wheel, not shown, of the mechanism to be driven. Such opening 36 also enables assuring the angular orientation of cage 2a upon its assembly on the stator 4.

As is seen very clearly on FIG. 2, such opening 36 forms a cut-out extending over a portion only of cage 2a in the neighbourhood of the first guidance orifice 26 arranged in bottom 18.

It will be further specified here that stator 4 includes two standard notches, respectively 40 and 42 opening out into a circular orifice 44 formed directly in stator 4 in order to accommodate cage 2a and in particular to receive body 20. Such notches 40 and 42 are provided in stator 4 for known electromagnetic reasons which consequently will not be described here in a more detailed manner. The engagement between body 20 and orifice 44 assures the radial positioning of cage 2a relative to stator 4. As is seen on FIG. 1, cage 2a traverses stator 4 and projects on either side thereof through orifice 44.

As is seen clearly on FIG. 1, in cross-section and in the top view by broken lines, cage 2a is fixedly maintained on stator 4 through a continuous glue line or several glue points, here two in number, respectively referenced 46 and 48 and arranged in diametrally opposed positions to extend between the surface 4a of rotor 4 and the seat 32.

Thus, glue points 46 and 48 partially overlie the outer cylindrical periphery of seat 32 and partially a region of the surface 4a of stator 4.

It is understood that, thanks to the anchoring means formed by these two glue points 46 and 48, cage 2a which is formed of synthetic material can be fixedly anchored onto stator 4 and maintained as well axially as angularly.

Thus, such anchoring means 46 and 48, which are provided between wall P of cage 2a and the stator 4, leave free wall P which is liberated from all lateral stress and so avoid all risk of deformation capable of spoiling the good operation of the motor and in particular guidance of rotor 6 within cage 2a.

Referring henceforth to FIGS. 3 and 4, there will be described hereafter a second embodiment of the electromagnetic motor according to the invention.

On these figures as well as on those following, the same references identify portions common to this second embodiment and the first which has been described hereinbefore with reference to FIGS. 1 and 2.

Cage 2b of the electromagnetic motor according to this second embodiment includes on the exterior two longitudinal ribs, respectively 50 and 52 which are integral with wall P of cage 2b and which extend along the latter from the seat 32 parallel to the rotation axis X.

Such ribs 50 and 52 which exhibit a semi-cylindrical form are respectively engaged in notches 40 and 42 of stator 4.

Thus, such engagement enables at least to assure the angular positioning of cage 2b relative to stator 4. Here it will be noted that cage 2b could, in an embodiment not shown, be blocked axially by gluing of the type such as described hereinbefore (FIG. 1 and 2).

In this embodiment, and as will be seen very clearly on FIG. 3, an intermediate outer region of wall P, referenced M, which is located above stator 4, is deformed in a permanent manner with the help of a sonotrode S capable of assuring heating of the synthetic material constituting wall P sufficient to enable upsetting the material towards stator 4. Thus, given that sonotrode S extends in a circular manner entirely around the projecting portion of cage 2b in which the cut-out 36 is formed, the axial lowering of such sonotrode S in the direction of arrow A on FIG. 3 assures upsetting the material entirely around the upper projecting portion of cage 2b, which material will come thus to overlie partially the upper surface 4b of stator 4.

Thus, as is seen in top view on FIG. 4, there has been formed entirely around the projecting portion of cage 2b a semi-circular bead 54 sufficiently overlying stator 4 so as to form, with seat 32, anchoring means for cage 2b. It will also be specified that such anchoring means can be obtained by deformed sectors, not shown, arranged on the outer periphery of cage 2b. Stator 4 is thus found to be confined between such bead 54 and seat 32 so that cage 2b is fixedly maintained in the axial direction, but also angularly thanks to ribs 50, 52 and cannot be removed from the latter, nor displaced in rotation.

It is thus understood that the anchoring means are formed partially by the seat 32 which rests axially against the lower face 4a of the stator 4 as well as by the bead 54 which overlies the upper face 4b of such stator.

In referring henceforth to FIGS. 5 and 6, there will be described hereinafter a third embodiment of the electromagnetic motor according to the invention.

This motor includes a cage 2c including longitudinal ribs 56 and 58 which are of the same type as those mentioned hereinabove and which extend over a length of the wall P clearly greater than the thickness of stator 4.

Thus, and as is seen on FIG. 5, during application of the two sonotrodes referenced S onto the free ends, not referenced, of the two ribs 56 and 58, the latter are deformed in a permanent manner because of heating of the material forming them. There are thus obtained two tongues, respectively 60 and 62 which there also partially overlie the upper surface 4b of stator 4 and which confine it in cooperation with seat 32.

Figure 8:
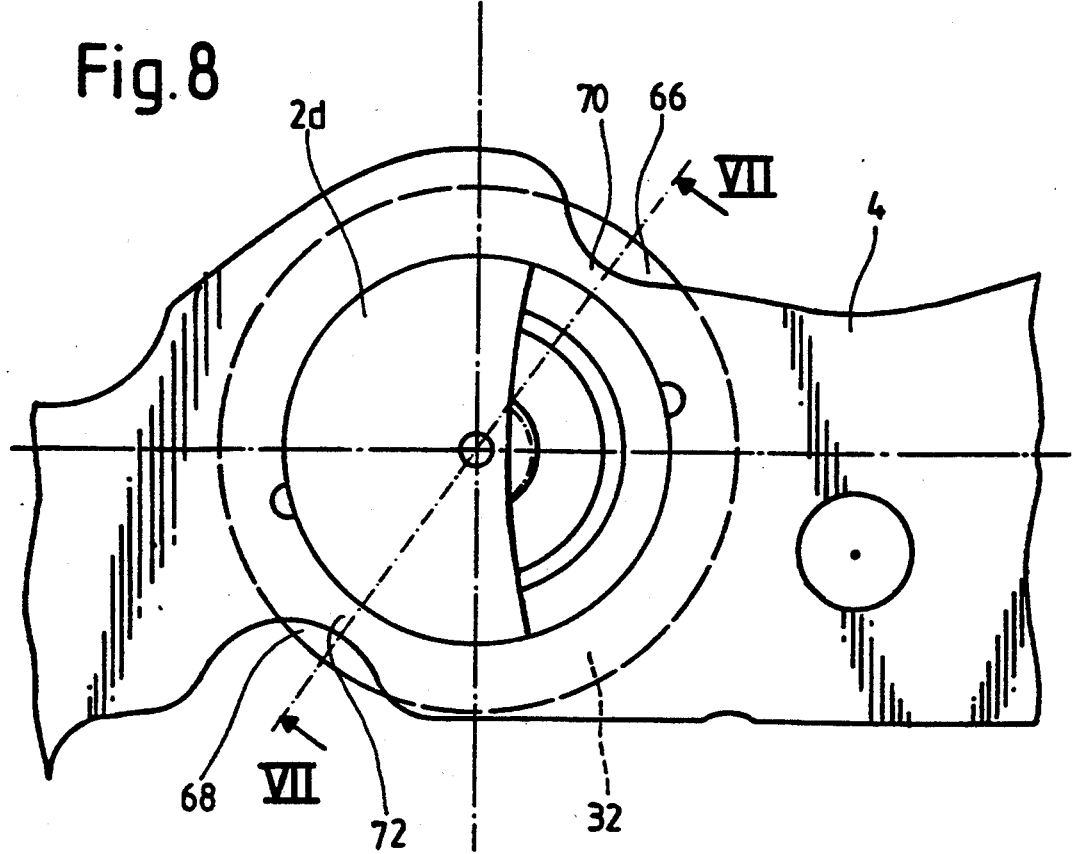

FIGS. 7 and 8 show a fourth embodiment of the electromagnetic motor according to the invention, in which cage 2d includes two lateral vanes, respectively 66 and 68, which extend longitudinally upwardly and in particular towards the bottom 18 from seat 32 at a distance from body 20.

The two vanes 66 and 68 match and partially overlie the outer contour of the necks of stator 4, respectively referenced 70 and 72. Such necks function to increase the flux reluctance at a predetermined location on stator 4 and such electromagnetic design which is known will not be described in a more detailed fashion.

Thus, it is understood that cage 2d is positioned thanks to such vanes 66, 68 engaged with necks 70, 72 in a precise angular manner, in benefiting from the necks 70 and 72 originally located on stator 4 which is of known conception. What is more, vanes 66 and 68 assure an initial maintenance in place of cage 2d, by friction and by lateral elastic pressure, before its definitive setting into place is effected.

In the embodiment shown, as is seen more specifically on FIG. 7, such definitive setting into place is brought about by the permanent deformation of a stud 74 formed exteriorly on the bottom 18 and projecting axially therefrom. Stud 74 is engaged in particular in a wheel train bridge or in a baseplate R, here partially shown, belonging to a timepiece. The upper portion, not referenced, of such stud 74 is thus heated, likewise for example by ultrasonic means, and it is brought to overlie the wheel train bridge or the baseplate R in order to confine such between the deformed portion of such stud 74 and the bottom 18. Thus, anchoring of cage 2d of stator 4 is assured and cage 2d is fixedly maintained in the axial direction relative to the stator.

Figure 9:
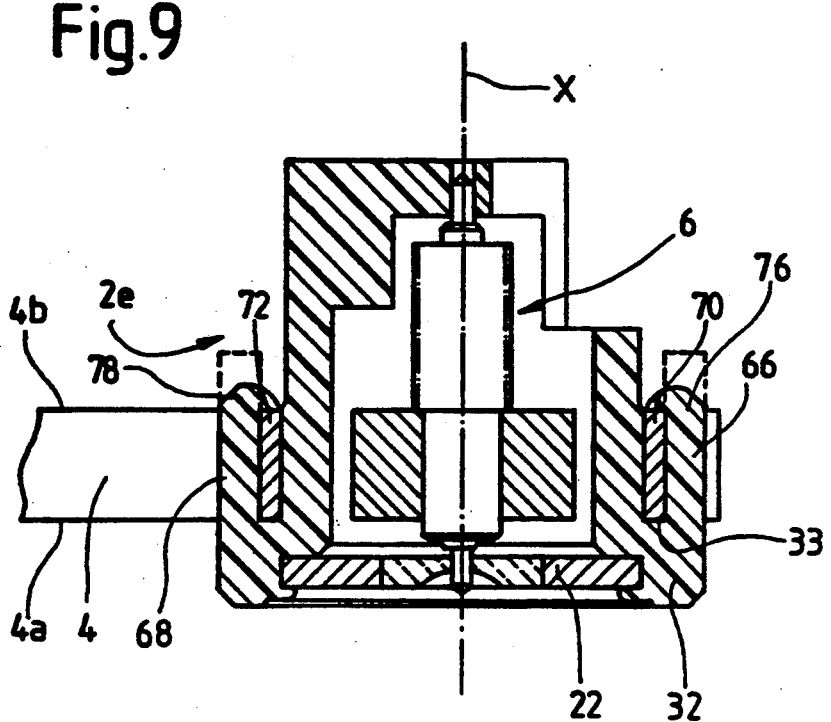
Figure 10:
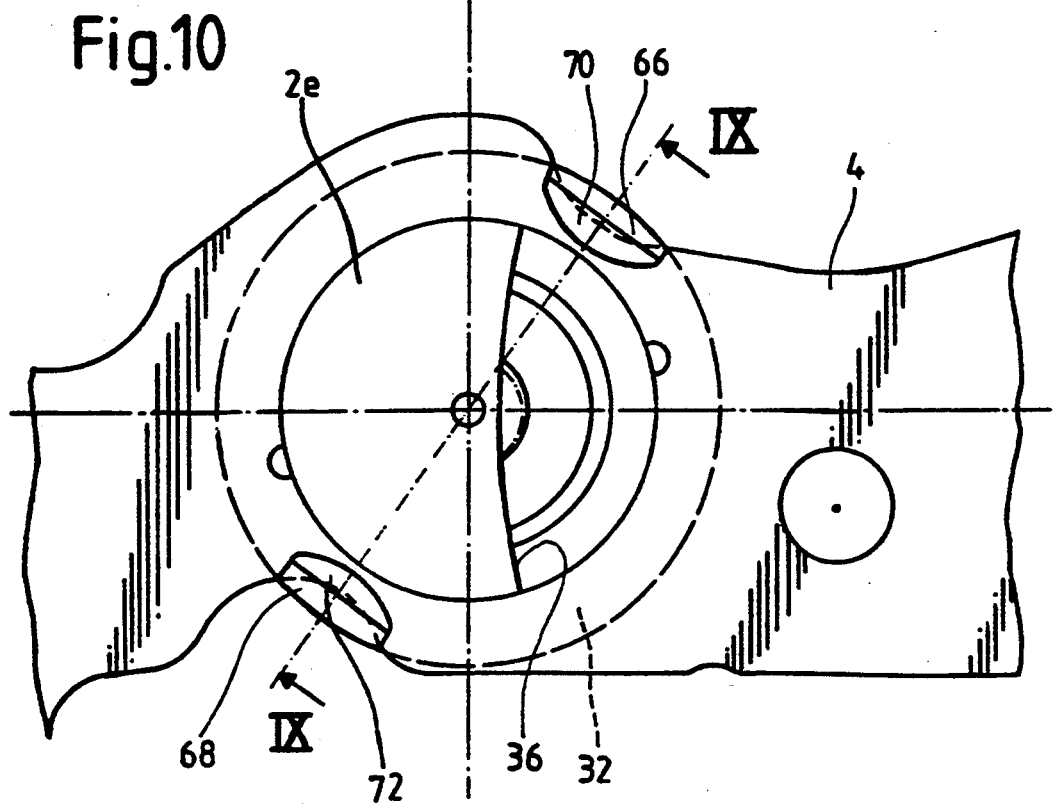

In the fifth embodiment shown on FIGS. 9 and 10, vanes 66 and 68, prior to the final phase of deformation of the material, extend above stator 4 to project beyond its upper surface 4b. Following application of one or several sonotrodes, not shown and an ultrasonic heating of the free ends, not referenced, of vanes 66 and 68, two tongues or flaps 76 and 78 are created and are brought to overlie the upper surface of necks 70, 72 to confine them fixedly in cooperation with seat 32 and to block cage 2e.

It is thus understood from what has just been described that the means for angular positioning and axial securing of the cage described in these embodiments may be combined among themselves in order to furnish anchoring means assuring adequate blocking of the cage on the stator without risking the appearance of stresses, in particular radial stresses, in wall P.

What we claim is:

1. An electromagnetic motor including a stator having an upper and a lower face and an orifice extending therebetween, a cage having a wall forming a body which is engaged in said orifice and which comprises an upper projecting portion traversing the orifice and extending above said upper face of the stator, and a rotor mounted in said cage for rotation relative to the stator, the cage being formed of a synthetic material and further comprising mechanical anchoring means for fixedly maintaining the cage with respect to the stator in an axial direction, said means comprising a seat extending radially outwardly from the body of the cage and engaging said lower face of the stator, and at least one bead extending radially outwardly from the upper projecting portion of the cage to partially superpose the upper face of the stator, said bead being constituted by a deformed section of said upper projecting portion, so that said bead and said seat confine said stator therebetween and leave the wall of the body free from any radial stresses resulting from the stator.

2. A electromagnetic motor as set forth in claim 1, wherein said bead extends around said upper projecting portion.

3. An electromagnetic motor as set forth in claim 2, wherein said bead has a semi-circular shape.

4. An electromagnetic motor as set forth in claim 1, wherein said bead extends from the outer periphery of said upper projecting portion.

5. An electromagnetic motor as set forth in claim 1 wherein said stator includes a notch, and further including a longitudinal rib extending over a length of the cage wall and fitting into said notch of the stator in order to form angular positioning means for the cage.

6. An electromagnetic motor as set forth in claim 5, wherein said rib, in being plastically deformed in the direction of the stator, forms said bead.

7. An electromagnetic motor as set forth in claim 1 wherein said stator includes a plurality of notches, and further including a plurality of longitudinal ribs extending over a length of the cage wall and respectively fitting said notches of the stator in order to form angular positioning means for the cage, said ribs, in being plastically deformed in the direction of the stator, providing tongues extending radially from the wall of the cage and forming thereon a plurality of beads overlying the upper surface of the stator.

8. An electromagnetic motor for use in a timepiece comprising a support plate having an upper surface, said motor including a stator having an upper and a lower face and an orifice extending therebetween, a cage having a wall forming a body which is engaged in said orifice, said cage including an upper projecting portion traversing the orifice and extending above said upper face of the stator, and a rotor mounted in said cage for rotation relative to the stator, the cage being formed from a synthetic material and further comprising mechanical anchoring means for fixedly maintaining the cage with respect to the stator in an axial direction, said means comprising, firstly, a seat extending radially outwardly from the body of the cage and engaging said lower face of the stator and, secondly, at least one stud extending axially outwardly from the upper projecting portion of the cage to partially superpose the upper face of said support plate of the timepiece, said stud being constituted by a deformed section of the upper projecting portion, so that said stud and said set confine said stator and said support plate therebetween and leave the wall of the body free from any radial stresses resulting from the stator.

9. An electromagnetic motor as set forth in claim 5 wherein said stator includes necks formed therein, and further including vanes extending longitudinally from the seat and cooperating with said necks for forming angular positioning means of the cage with respect to the stator and the support plate.

10. An electromagnetic motor including: a stator having an upper and a lower face and an orifice extending therebetween and a neck formed therein, a cage having a wall forming a body engaged in said orifice, and a rotor mounted in said cage for rotation relative to the stator, said cage being formed from a synthetic material and including a seat extending radially outwardly from the body, said seat having at least one vane which extends axially from the seat above the upper face of the stator, said neck being formed on the stator between said upper and lower face thereof for cooperating wish said vane to form angular positioning means of the cage with respect to the stator, said cage further including a mechanical anchoring means for fixedly maintaining the cage with respect to the stator in an axial direction, said means comprising, firstly, said seat which engages the lower face of the stator and, secondly, at least one tongue or flap extending radially from said vane to partially superpose the upper face of said neck, said tongue or flat and said seat confining said stator therebetween and leaving the wall of the body free from any radial stresses resulting from the stator.

* * * * *